United States Patent [19]

Ikeyama et al.

[11] Patent Number: 5,587,136
[45] Date of Patent: Dec. 24, 1996

[54] DRY PROCESS DESULFURIZATION AND DENITRIFCATION PROCESS

[75] Inventors: Nobuhide Ikeyama; Yutaka Iwanaga, both of Fukuoka-ken, Japan

[73] Assignee: Mitsui Mining Co., Ltd., Tokyo, Japan

[21] Appl. No.: 433,927

[22] Filed: May 2, 1995

[30] Foreign Application Priority Data

May 10, 1994 [JP] Japan ................. 6-119655

[51] Int. Cl.$^6$ ........................ C10B 21/00
[52] U.S. Cl. ............. 423/239.1; 423/235; 423/244.01
[58] Field of Search ............... 423/235, 239.1, 423/244.01

[56] References Cited

U.S. PATENT DOCUMENTS

| | | | |
|---|---|---|---|
| 4,113,660 | 9/1978 | Abe et al. | 252/455 R |
| 4,915,921 | 4/1990 | Richter et al. | 423/239 |
| 4,916,107 | 4/1990 | Brand et al. | 502/309 |
| 4,940,567 | 7/1990 | Ohlmeyer et al. | 422/173 |
| 5,045,516 | 9/1991 | Vogel et al. | 502/309 |
| 5,053,210 | 10/1991 | Buxel et al. | 423/239 |
| 5,124,303 | 6/1992 | Kobayashi et al. | 502/241 |
| 5,294,584 | 3/1994 | Yoshida et al. | 502/242 |

Primary Examiner—Michael Lewis
Assistant Examiner—Amy M. Harding
Attorney, Agent, or Firm—Wenderoth, Lind & Ponack

[57] ABSTRACT

The present invention provides a desulfurization and denitrification process by dry process, whereby a stable operation is rendered possible at a temperature of 100° to 200° C. with a high energy efficiency and without deterioration of a catalyst for a long time and any problem on by produced $N_2O$. This process comprises treating a waste gas containing SOx and NOx with catalyst-poisoning materials in an apparatus for mainly effecting desulfurization and then in an apparatus for mainly effecting denitrification, characterized by passing the waste gas through a desulfurization apparatus of moving bed type, in which a carbonaceous adsorbent is moved downward at a temperature of 100° to 200° C., adding ammonia to the waste gas at a temperature of 100° to 200° C., leaving the desulfurization apparatus, and then passing the waste gas through the low temperature denitrification apparatus, in which a catalyst of $TiO_2$-$V_2O_5$ type comprising vanadium oxide supported on titanium oxide of anatase type, having a specific surface area of 100 to 250 $m^2/g$ and micropores of 1.5 to 2.5 nm in pore diameter and 7.5 to 8.5 nm in pore diameter respectively in an amount of at least 0.05 cc/g, is filled, at a temperature of 100° to 200° C., thus effecting the denitrification.

8 Claims, 6 Drawing Sheets

DRY PROCESS DESULFURIZATION AND DENITRIFCATION PROCESS

BACKGROUND OF THE INVENTION

1. Field of the Invention

This invention relates to a dry desulfurization and denitrification process for removing SOx and NOx in effective manner from various combustion waste gases.

2. Description of the Prior Art

As a method of removing SOx and NOx from waste gases such as combustion waste gases of various fuels, burning-up waste gases of dusts, etc., it has been proposed to combine various desulfurization treatments and denitrification treatments. For example, Japanese Patent Laid-Open Publication No. 132628/1985 has proposed a method comprising removing SOx in a waste gas to 400 ppm by the use of adsorption coke, as a pre-treatment, mixing the waste gas with ammonia and treating NOx with a catalyst such as cokes containing metal oxides each having a small adsorption capacity of $SO_2$, as an after-treatment. This technique is aiming at solving a problem on the initial contamination of activated carbon with ammonium sulfate in a denitrification bed in a method comprising providing two activated carbon adsorption beds, adding ammonia to each of these beds, carrying out predominantly desulfurization in the first bed and carrying out predominantly denitrification in the second bed.

Japanese Patent Laid-Open Publication No. 254825/1987 has proposed, as a method for treating a boiler waste gas, to carry out desulfurization and denitrification in order, followed by dust removal. In this method, the wet desulfurization is combined with the commonly used denitrification apparatus and ammonium sulfate formed by the reaction of $SO_3$ resulting from the denitrification treatment with ammonia is collected as a dust.

Japanese Patent Laid-Open Publication No. 166214/1992 has proposed an apparatus for the desulfurization and denitrification of a waste gas from a sintering machine, ordinarily, at a temperature of 80° to 130° C., comprising a means for desulfurization by dry process using a carbonaceous adsorbent, a means for heating the waste gas as an after-treatment and a means for denitrification of a catalytic type, in which the denitrification is carried out at 350° to 400° C. In this technique, the desulfurization means by dry process is combined, because a wet process desulfurization means, used as a pre-treatment in the prior art, cannot sufficiently remove $SO_3$, Na, K, Cl, F, etc. which lower the function of the denitrification catalyst in an after-treatment, and the temperature of the waste gas is largely lowered.

According to these methods, after the desulfurization, the denitrification is carried out by adding ammonia to a waste gas and passing it through a carbonaceous adsorbent bed and various metallic catalyst beds. The denitrification treatment using a carbonaceous adsorbent bed is carried out under conditions of a temperature range of 100° to 200° C. and a space velocity of at most 1000 $hr^{-1}$, but this method raises a problem that the installation is large-sized.

The denitrification treatment using a metallic catalyst is ordinarily carried out by a method comprising adding ammonia to a gas containing NOx and then contacting the gas with the catalyst at a high temperature, i.e. 200° to 500° C., preferably 250° to 400° C. to decompose NOx. This method generally gives a high decomposing capacity of NOx but, since the catalyst used herein tends to be more deteriorated with catalyst-poisoning materials such as sulfur compounds or halogen compounds and if mercury is not sufficiently removed, it adheres to the catalyst and covers the catalyst to lower the catalytic activity, it is required to sufficiently remove these catalyst-poisoning materials contained in a waste gas before being introduced in a catalyst bed.

As a pretreatment in the denitrification treatment using a metallic catalyst, removal of SOx contained in a large amount in a waste gas has mainly been taken into consideration up to the present time. In the ordinary waste gas treatment, accordingly, a waste gas is introduced into a desulfurization treatment apparatus by wet process, having achieved the most actual satisfactory results as a desulfurization means, to remove the most part of SOx in the waste gas and then fed to a denitrification apparatus.

In such a desulfurization method by wet process, SOx can be removed, but mercury or halogen compounds such as dioxin, except hydrogen halides, are hard to be completely removed, causing a shortened life of a catalyst in a subsequent denitrification apparatus. In the wet process treatment, furthermore, the temperature of a waste gas to be treated is lowered, so even when a boiler combustion waste gas at a high temperature, for example, 250° to 400° C. is treated, it is required to heat again the waste gas to raise the temperature thereof before introducing into the denitrification apparatus, thus resulting in a problem that the energy loss is large.

As the regulation of environment is getting severer, in addition, it has further been required for the denitrification catalyst to increase the activity thereof and to suppress formation of byproducts and various catalysts have been developed as described hereinafter. However, these catalysts have excellent properties, but they are subject to influences by catalyst-poisoning materials and respectively need a combination with an effective pretreatment.

On the other hand, various studies have been made as to the denitrification techniques and thus a number of catalysts having denitrification activity have been developed. These catalysts consist predominantly of metals such as platinum group metals, iron group metals, vanadium, chromium, cobalt, nickel and the like or oxides thereof and are ordinarily used at a high temperature, e.g. 250° to 400° C. Thus, a waste gas should be heated again to raise the temperature thereof before introducing it into a denitrification apparatus, resulting in a problem that the energy loss is large.

Depending upon the catalysts, nitrous oxide ($N_2O$), which is considered to contribute to warming up the earth and breakage of the ozone layer, is formed during decomposition step of NOx.

Regarding the treatment temperature, an denitrification catalyst active in a relatively low temperature range has been developed and for example, Japanese Patent Publication No. 2912/1979 discloses a process for the decomposition of nitrogen oxides, comprising bringing nitrogen oxides into contact with a catalyst comprising vanadium supported on titanium oxide of anatase type in the presence of ammonia at a temperature of 150° to 650 ° C. The catalyst used in this method exhibits activity at a temperature of at least 150 ° C., as described in this publication, but the specific surface area thereof is so small, i.e. at most 50 $m^2/g$ and the denitrification activity is markedly lowered at a reaction temperature of at most 170° C. to lower the decomposition capacity of NOx.

That is, even these catalysts of $TiO_2$-$V_2O_5$ type practically need a temperature of 200° to 500° C. and when using these catalysts, furthermore, there arises a problem that $N_2O$ is by produced in a proportion of 5 to 10% based on NOx, thus resulting in possibility of the secondary pollution.

Furthermore, in spite of that these catalysts are more subject to influences by catalyst-poisoning materials, a useful desulfurization and denitrification process at a temperature of 100° to 200° C. in combination with a suitable pretreatment method has not been developed yet.

In the catalysts of $TiO_2$-$V_2O_5$ type, a catalyst having a relatively high specific surface area and specified pore ratio has been proposed. In Japanese Patent Laid-Open Publication No. 86845/1990, for example, a catalyst for denitrification is disclosed in which the pore distribution of the anatase-type titania used as a support is controlled in such a manner that the porosity of pores (pores of at most 60 nm in diameter) is in the range of 0.05 to 0.5 cc/cc, the porosity of macropores (pores of at least 60 nm in diameter) is in the range of 0.05 to 0.5 cc/cc and the total porosity is at most 0.80 cc/cc to raise the denitrification property. Furthermore, Japanese Patent Laid-Open Publication No. 130140/1985 discloses a catalyst for the denitrification of a waste gas comprising titanium oxide, tungsten oxide and vanadium oxide as catalytic active components and having a specific surface area of 80 to 200 $m^2/g$, pore volume of 0.1 to 0.5 cc/g and micropores of at most 10 nm in diameter and macropores of 10 to 104 nm in diameter.

In these catalysts, however, the contacting temperature is practically adjusted to at least 200° C. so as to attain a high denitrification property and if the contacting temperature is lower than this range, the catalytic effect is insufficient, for example, as shown by low denitrification property, byproducts of $N_2O$, etc.

In Japanese Patent Laid-Open Publication No. 200741/1992, there is proposed a catalyst comprising vanadium supported on titanium oxide of anatase type, having a specific surface area of about 150 $m^2/g$. This catalyst aims at adsorbing and removing nitrogen oxides, for example, contained in a ventilation gas of a tunnel with a relatively low concentration, e.g. about 5 ppm through contact with the gas, which is conceptionally different from catalysts used for catalytic decomposition. This catalyst is considered to be given a high specific surface area for the purpose of improving its capacity because of being used for the adsorption and removal of nitrogen oxide.

As the regulation of environment is getting severer, denitrification catalysts having various properties have been proposed, but for the purpose of making up an excellent desulfurization and denitrification process by the use of these catalysts, it is necessary to provide a combination with a suitable desulfurization means and conditions regarding every catalyst.

SUMMARY OF THE INVENTION

It is an object of the present invention to provide a desulfurization and denitrification process by dry process, capable of removing SOx and NOx with high efficiency from various combustion waste gases.

It is another object of the present invention to provide a desulfurization and denitrification process by dry process, whereby the problems of the prior art can be solved and a stable operation is rendered possible at a temperature of 100° to 200° C. with a high energy efficiency and without deterioration of a catalyst for a long time and problem on by produced These objects can be attained by a process for the desulfurization and denitrification by dry process comprising treating a waste gas containing SOx and NOx with catalyst-poisoning materials in an apparatus for mainly effecting desulfurization and then in an apparatus for mainly effecting denitrification, characterized by passing the waste gas through a desulfurization apparatus of moving bed type, in which a carbonaceous adsorbent is moved downward at a temperature of 100° to 200° C., adding ammonia to the waste gas at a temperature of 100° to 200° C., leaving the desulfurization apparatus, and then passing the waste gas through the low temperature denitrification apparatus, in which a catalyst of $TiO_2$-$V_2O_5$ type comprising vanadium oxide supported on titanium oxide of anatase type, having a specific surface area of 100 to 250 $m^2/g$ and micropores of 1.5 to 2.5 nm in pore diameter and 7.5 to 8.5 nm in pore diameter respectively in an amount of at least 0.05 cc/g, is filled, at a temperature of 100° to 200° C., thus effecting the denitrification.

BRIEF DESCRIPTION OF THE DRAWINGS

The accompanying drawings are to illustrate the principle and merits of the present invention in detail.

DETAILED DESCRIPTION OF THE INVENTION

Figure 1:
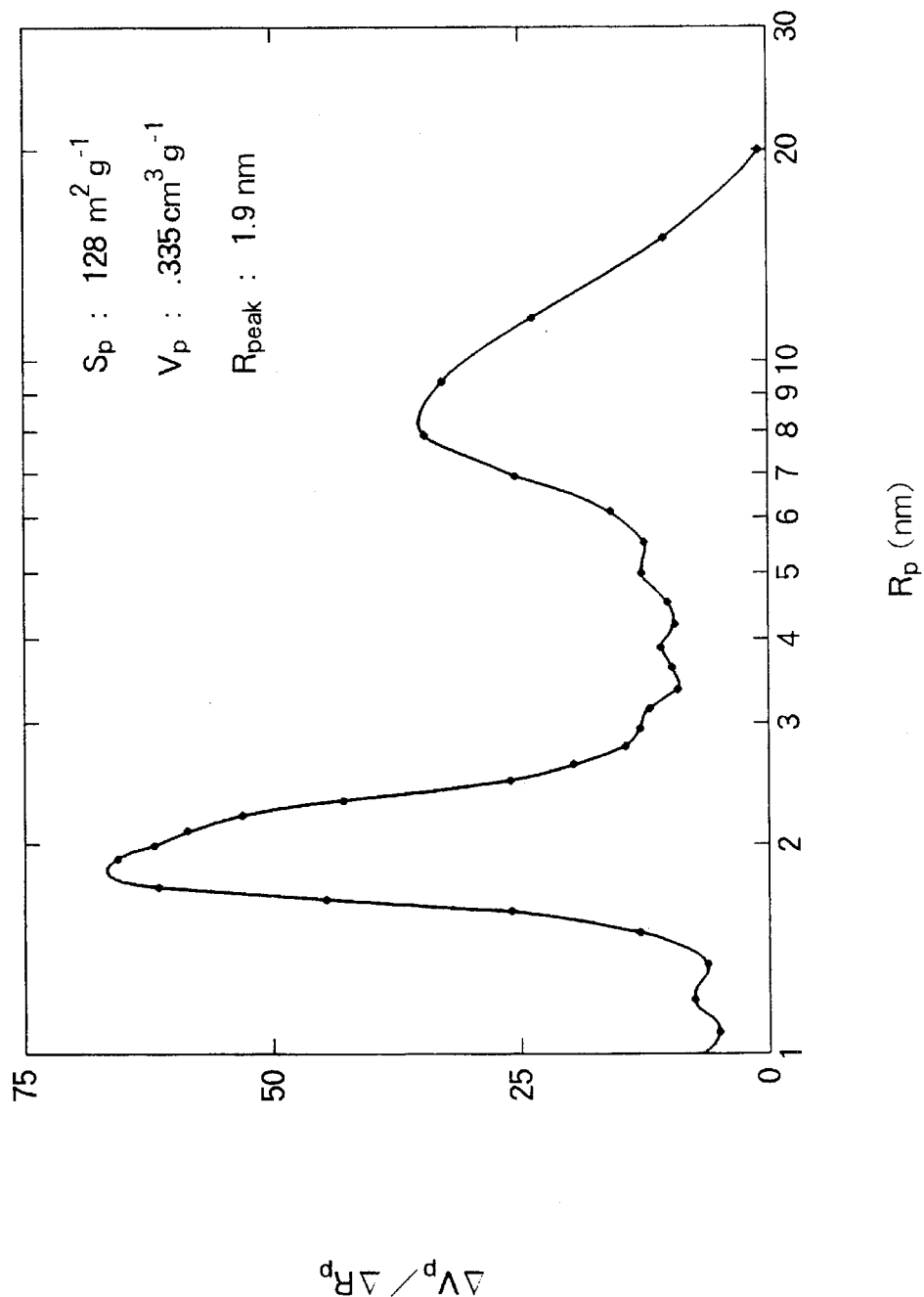
FIG. 1 is a graph showing a pore distribution of an example of the denitrification catalyst used in the present invention.

The inventors have found that a catalyst of $TiO_2$-$V_2O_5$ type comprising vanadium oxide supported on titanium oxide of anatase type, having a specific surface area of 100 to 250 $m^2/g$ and micropores of 1.5 to 2.5 nm in pore diameter and 7.5 to 8.5 nm in pore diameter respectively in an amount of at least 0.05 cc/g has an activity capable of decomposing NOx at a low temperature range of 100° to 200° C. and consequently, have completed an invention based on this finding (Japanese Patent Application No. 89479/1993).

Furthermore, the inventors have found that in the denitrification process using the above described catalyst, the denitrification with a high denitrification efficiency is rendered possible by noting and examining the residual and allowable ranges of contents of SOx having a large poisoning action and contained in a large amount in a waste gas, mercury having a large poisoning action due to adsorption on the catalyst and some of organo halogen compounds contained in relatively large amounts and being hardly removed in a pretreatment apparatus, and adjusting the contents of SOx to at most 10 ppm, the organo halogen compounds to at most 15 µg/$m^3$ and mercury to at most 15

μg/m³, and it is most effective to combine with a desulfurization apparatus using a carbonaceous adsorbent so as to decrease the contents of these catalyst-poisoning materials to at most the above described level. The present invention is based on this finding.

Accordingly, the present invention provides a process for the desulfurization and denitrification by dry process comprising treating a waste gas containing SOx and NOx with catalyst-poisoning materials in an apparatus for mainly effecting desulfurization and then in an apparatus for mainly effecting denitrification, characterized by passing the waste gas through a desulfurization apparatus of moving bed type, in which a carbonaceous adsorbent is moved downward at a temperature of 100° to 200° C., adding ammonia to the waste gas at a temperature of 100° to 200° C., leaving the desulfurization apparatus, and then passing the waste gas through the low temperature denitrification apparatus, in which a catalyst of $TiO_2$-$V_2O_5$ type comprising Vanadium oxide supported on titanium oxide of anatase type, having a specific surface area of 100 to 250 m²/g and micropores of 1.5 to 2.5 nm in pore diameter and 7.5 to 8.5 nm in pore diameter respectively in an amount of at least 0.05 cc/g, is filled, at a temperature of 100° to 200° C., thus effecting the denitrification.

In a preferred embodiment of the above described desulfurization and denitrification process according to the present invention, the treatment in the desulfurization apparatus is carried out in such a manner that the contents of SOx, organo halogen compounds and mercury in the waste gas are respectively adjusted to at most 10 ppm, at most 15 μg/m³ and at most 15 μg/m³.

The desulfurization and denitrification process by dry process according to the present invention are particularly suitable for treatment of waste gases from coal burning boilers or dust burning-up furnaces. These waste gases ordinarily contain at most 2000 ppm of SOx and at most 500 ppm of NOx with catalyst-poisoning materials such as at most 300 μg/m³ of Hg, at most 60 ppm of HCl and 20 μg/m³ of organo halogen compounds.

Details of the catalyst-poisoning mechanism of these materials are not clear, but in the case of SOx contained in a large amount and having a large catalyst-poisoning action, this mechanism is probably due to chemical poisoning of catalytic active sites and physical clogging. Namely, ammonia added during denitrification is adsorbed on the surface of the catalyst to form active sites, but $SO_2$ as a predominant component of SOx is oxidized by the action of vanadium in the denitrification catalyst to form $SO_3$ which causes poisoning of the active sites through reaction with ammonia and physical clogging thereof by ammonium sulfate or acidic ammonium sulfate. Furthermore, mercury and organo halogen compounds cause mainly clogging of pores by adhesion thereof with the passage of time.

Waste gases to be treated by the present invention contain halogen compounds, for example, inorganic halogen compounds such as HCl, organic halogen compounds such as dioxin, etc. Ordinarily, the inorganic halogen compounds are contained in much more amounts, but the organic halogen compounds having higher activity as catalyst-poisoning materials must be removed with a higher removal efficiency. The reason therefor is not clear, but it is considered that the inorganic halogen compounds are converted into ammonium chloride in the denitrification step, which is not so adsorbed on the catalyst and which has only little catalyst-poisoning property, while the organic halogen compounds such as dioxin physically clog pores in the catalyst of the present invention like mercury so that the pores gradually become smaller to decrease the catalytic activity.

In the present invention, a waste gas containing SOx and NOx is first introduced into a desulfurization reactor of moving bed type, in which a carbonaceous adsorbent is moved from the upper part to the lower part, and passed through it transversely to the flow of the carbonaceous adsorbent at a temperature of 100° to 200° C. to effect the desulfurization treatment. Since a waste gas discharged from a boiler or burning-up furnace is ordinarily at a temperature of about 250° to 400° C., the waste gas is introduced into the desulfurization reactor after adjusting to a temperature of 100° to 200° C. by the use of an air heater, etc. In this desulfurization reactor, the treatment is carried out by controlling the flow rates of the waste gas and carbonaceous adsorbent and the residence time in the reactor in such a manner that the contents of SOx and mercury contained in the waste gas be respectively at most 10 ppm and at most 15 μg/m³. If the contents of SOx and mercury contained in the gas to be treated are more than these values, deterioration of the catalyst becomes fast in the subsequent denitrification apparatus. This is not preferable. In this step of the denitrification treatment, the organic halogen compounds such as dioxin are also removed to a content of at most 15 μg/m³.

The desulfurization apparatus using a carbonaceous adsorbent has a large removal capacity of mercury and halogen compounds, in particular, those such as dioxin, except hydrogen halides, which are hard to be removed by the desulfurization apparatus of wet process, having widely been used as a desulfurization apparatus, and is thus suitable as a desulfurization apparatus to be used in the present invention.

In the present invention, there can be used a moving bed type or fixed bed type as a desulfurization system using a carbonaceous adsorbent. In the case of the fixed bed type, the period of time for changing the carbonaceous adsorbent is shorter than in the case of the moving bed type. Accordingly, the moving bed system is preferably used.

The denitrification treatment according to the present invention is carried out by adding ammonia to the gas treated in and leaving the desulfurization reactor in a proportion of 0.7 to 1.5 mol ratio to NOx contained in the gas and passing it through the low temperature denitrification apparatus, in which a catalyst of $TiO_2$-$V_2O_5$ type comprising vanadium oxide supported on titanium oxide of anatase type, having a specific surface area of 100 to 250 m²/g and micropores of 1.5 to 2.5 nm in pore diameter and 7.5 to 8.5 nm in pore diameter respectively in an amount of at least 0.05 cc/g, is filled, at a temperature of 100° to 200° C., thus effecting the denitrification. The type of the denitrification apparatus is preferably a fixed bed type so as to prevent the catalyst from powdering and scattering.

The thus treated gas leaving the desulfurization reactor maintains a temperature of 100° to 200° C. without substantial lowering of it and accordingly, it can ordinarily be introduced into the denitrification apparatus as it is without subjecting to a temperature raising treatment. If necessary, the treated gas is again heated and then introduced into the denitrification apparatus, during which the energy required for the temperature raising is much less than in the case of using the wet process desulfurization apparatus of the prior art.

Up to the present time, as titanium oxide, there has been used that of ganatase type in the catalyst of $TiO_2$-$V_2O_5$ type used as a denitrification catalyst. In the case of titanium oxide of anatase type, however, a high denitrification efficiency cannot be obtained at a low temperature, e.g. 100° to 200° C. when the specific surface area is smaller than above specified, or when the conditions of providing micropores of 1.5 to 2.5 nm in pore diameter and 7.5 to 8.5 nm in pore diameter respectively in an amount of at least 0.05 cc/g are not simultaneously satisfied even if using the titanium oxide of anatase type.

In the case of the denitrification apparatus of the prior art, using an ordinary metallic catalyst, a high temperature, e.g. 250° to 400° C. is required, while in the process of the present invention, using the above described catalyst, the denitrification can well be carried out at a low temperature, e.g. 100° to 200° C.

In the present invention, the denitrification catalyst having the specified specific surface area and pore distribution, as described above, is used. The known catalyst using a support of titanium oxide has a specific surface area of ordinarily at most about 50 m$^2$/g or more than 100 m$^2$/g. On the contrary, one of the features of the present invention consists in that the catalyst has a large specific surface area in the specified range, i.e. 100 to 250 m$^2$/g. This means that the use of the catalyst having a large specific surface area results in an increased pore volume, i.e. about 6.0 cc/g, as a whole of the catalyst.

The denitrification catalyst used in the present invention can be produced by the following process. Titanyl sulfate is used as a starting material, which is hydrolysed in aqueous state to form titanium oxide hydrate and then calcined to form titanium oxide of anatase type. In this case, the reaction is carried out under such reaction conditions that the hydrolysis temperature is 80° to 120° C., preferably 90° to 110° C., the hydrolysis time is 0.5 to 25 hours, preferably 1 to 20 hours, and the calcination time is 1 to 5 hours, preferably 1 to 2 hours, in suitable combination, thereby obtaining titanium oxide of anatase type, having a specific surface area and pore distribution in the above described ranges. Even under the reaction conditions in the above described ranges, the specific surface area and pore distribution of a support are sometimes contrary to the object of the present invention depending on a combination of the reaction conditions. For example, when the hydrolysis is carried out at a low temperature (80° C.) for a short time (shorter than 15 hours), pores cannot be grown, and when the hydrolysis is carried out at a high temperature (110 ° C.) for a long time (5 hours), pores and pore volumes are decreased. Even if such a support is used, a catalyst with excellent properties cannot be obtained.

On the thus obtained titanium oxide of anatase type, having the predetermined specific surface area and pore distribution, is supported vanadium oxide, as a catalytic active component, to form a denitrification catalyst.

A method of supporting vanadium oxide is not particularly limited, but a preferable method is exemplified as follows. If necessary, a binder component such as colloidal silica, colloidal titania, colloidal alumina, etc. is added to vanadium oxide to prepare a mixture, to which water is added, followed by kneading, and the resulting mixture is mixed with titanium oxide as a support, shaped in a suitable shape, dried and if necessary, pulverized to control the grain size.

Furthermore, the above described binder component is if necessary added to vanadium oxide to prepare a mixture and mixed with water to form a slurry, which is then allowed to permeate through and adhere to a support of titanium oxide, followed by drying.

The specific surface area and pore distribution of titanium oxide of anatase type, prepared as a support, are hardly changed even when the catalytic active component is supported, and a catalyst having the similar surface area and pore distribution can thus be obtained.

Figure 2:
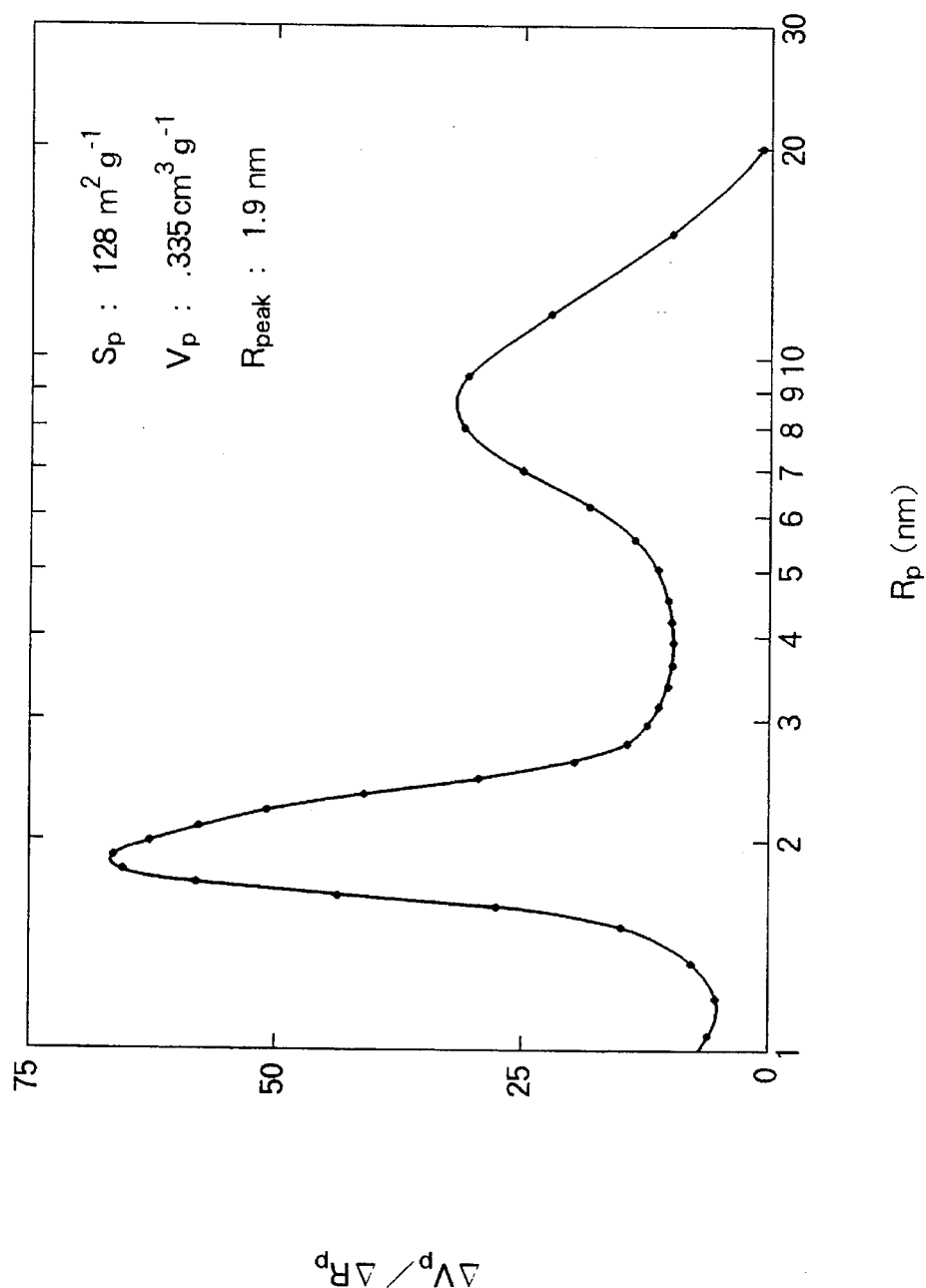
FIG. 2 is a graph showing a pore distribution of titanium oxide used in the catalyst of FIG. 1.
Figure 3:
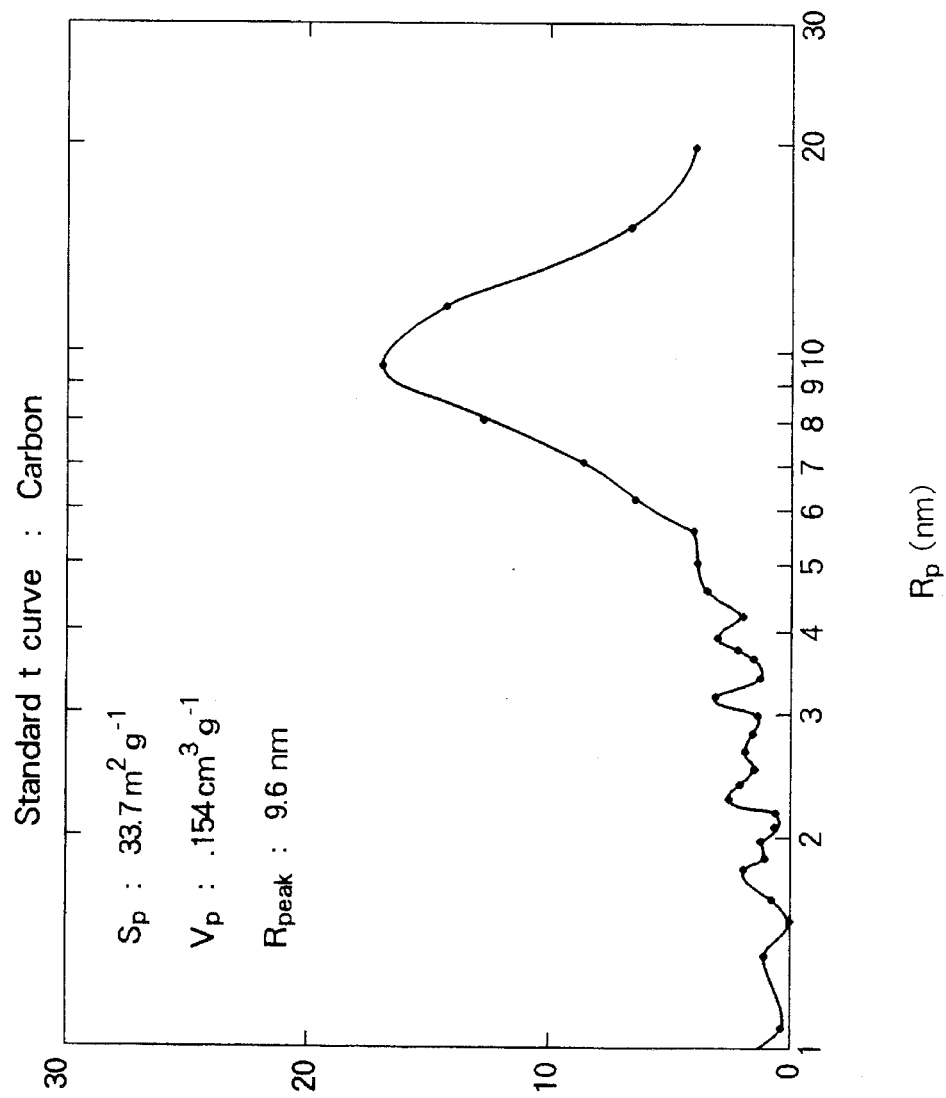
FIG. 3 is a graph showing a pore distribution of commercially available titanium oxide 2 of Table 1.
Figure 4:
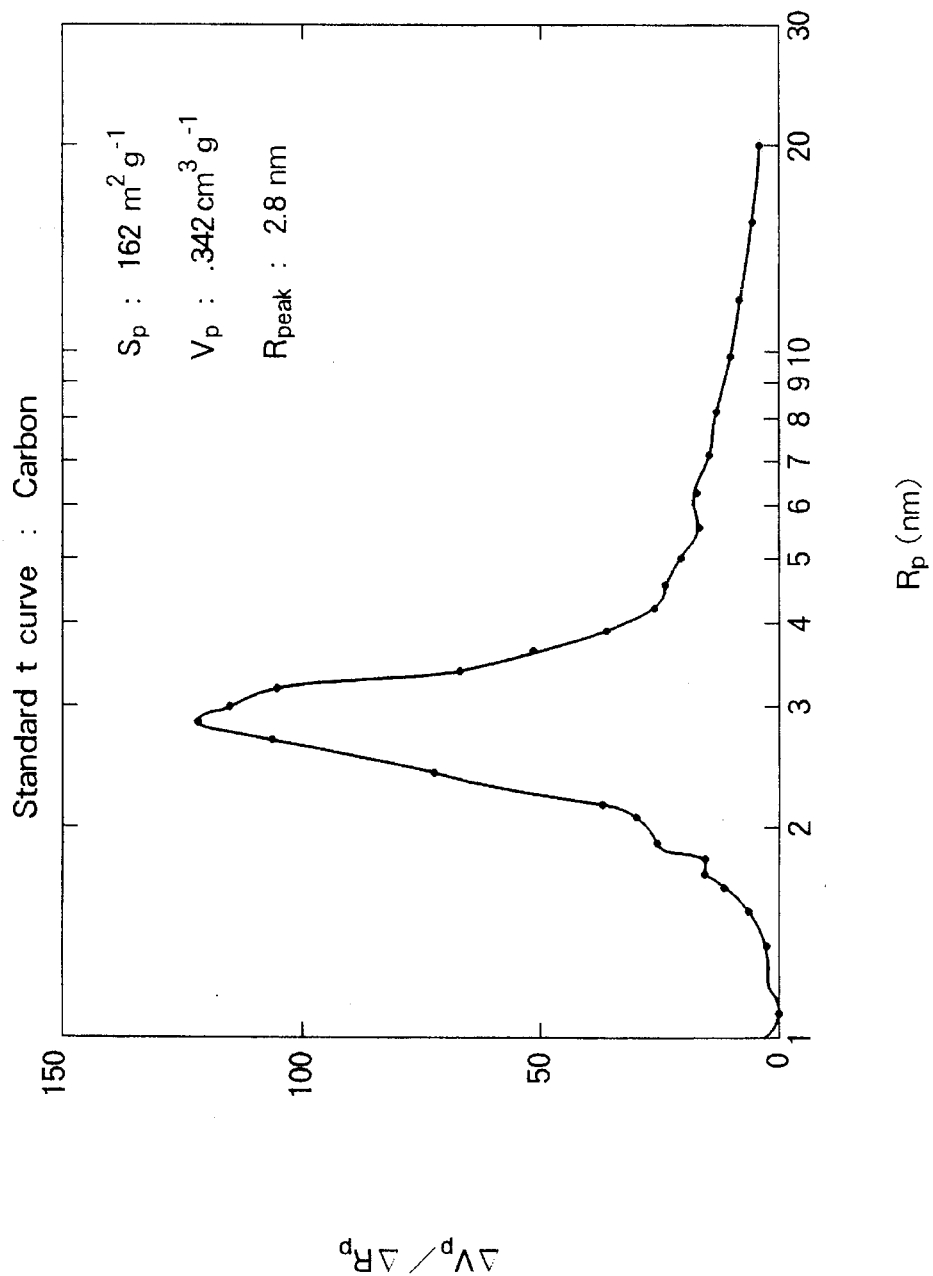
FIG. 4 is a graph showing a pore distribution of commercially available titanium oxide 3 of Table 1.

Examples of the pore distribution of the denitrification catalyst used in the present invention (Catalyst B in the following Example) and titanium oxide used therefor as a support are respectively shown in FIG. 1 and FIG. 2. For reference, measured results of the specific surface area and pore distribution of six kinds of ordinarily commercially available titanium oxides are shown in Table 1. Among them, the pore distributions of Commercially Available Samples 2 and 3 are respectively shown in FIG. 3 and FIG. 4. The pore distributions of FIG. 1 to FIG. 4 is measured by the Cranston Inkley Method (CI Method) using a BET apparatus and carbon black (porwe=0) as a reference and show parts of less than 30 nm.

In these figures, the marks have the following meanings:

$R_p$ : pore diameter (nm)

$V_p$ : pore volume (cc/g), $\Delta V_p/\Delta R_p$: change rate of pore volume (change of pore volume with change of pore diameter)

$S_p$ : specific surface area (m$^2$/g)

$R_{PEAK}$ : pore diameter with maximum peak present

TABLE 1

| Sample No.* | Specific Surface Area (m$^2$/g) | Pore Volume of 1.5–2.5 nm (cc/g) | Pore Volume of 7.5–8.5 nm (cc/g) |
| --- | --- | --- | --- |
| 1 | 9.18 | ≈0 | ≈0 |
| 2 | 33.7 | ≈0 | 0.01 |
| 3 | 162 | 0.02 | 0.02 |
| 4 | 111 | 0.04 | 0.02 |
| 5 | 134 | 0.05 | 0.02 |
| 6 | 232 | 0.07 | 0.02 |

Note:
*) commercially available sample

In this case, it is not always required to use vanadium oxide as a raw material, but any compound capable of being converted into vanadium oxide by a simple oxidation treatment can be used without any problem. That is, the vanadium oxide can be formed from in situ such a vanadium compound. Examples of the vanadium compound include $VOC_2H_4$, $VOCl_3$, $VOSO_4$ and the like. Particularly preferable compounds are vanadium oxide and ammonium metavanadate. In this case, the prepared catalyst is really used after subjecting to a heat treatment in an oxidizing atmosphere at a temperature of at least 150° C., preferably 200° to 450° C. to convert the most part thereof into a form of oxide. Depending on use conditions, the oxidation gradually proceeds during using, so the previous oxidation treatment can be omitted.

The supporting amount of the catalytic active component on a support is in the range of 0.1 to 20 weight % in the form of vanadium oxide. If less than 0.1 weight %, the catalytic activity is too low to be practically used, while if more than 20 weight %, the pore distribution of the support is changed and the reinforcing effect by the support is too small. This is not preferable.

EXAMPLES

The process of the present invention will specifically be illustrated by Examples concerning the desulfurization treatment and denitrification treatment individually.

Figure 5:
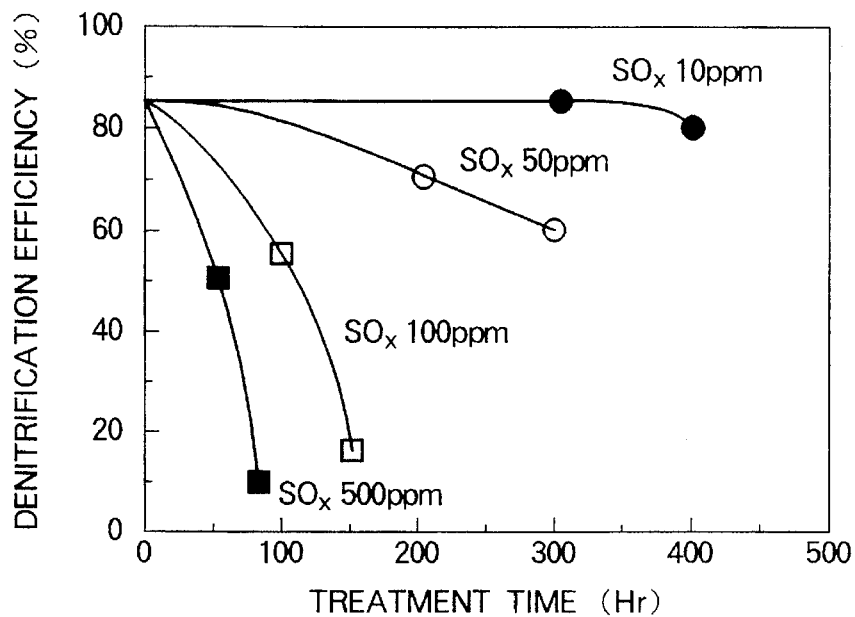
FIG. 5 is a graph showing the relationship between a denitrification ratio and treatment time at a reaction temperature of 120° C. in the case of adding SOx as a catalyst poisoning material.
Figure 6:
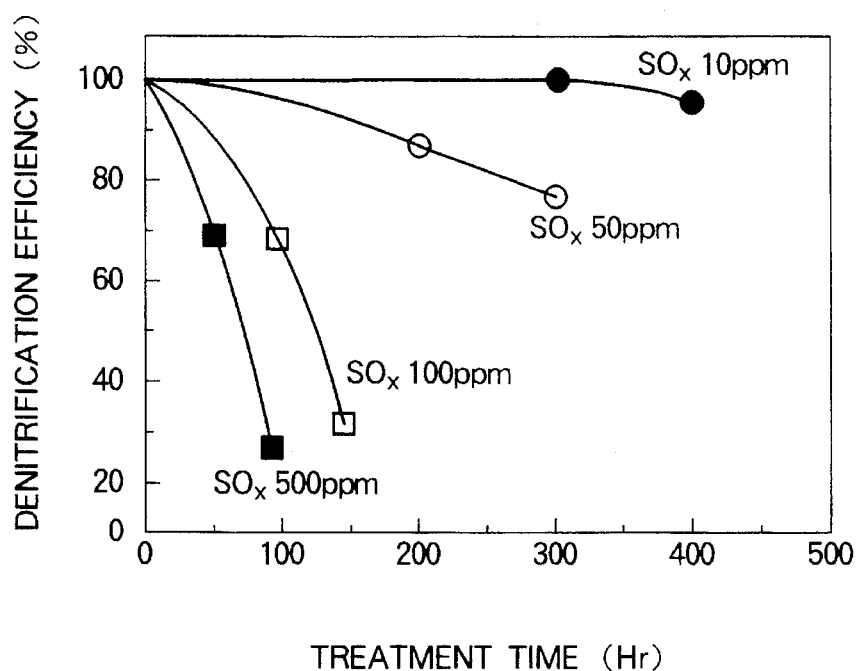
FIG. 6 is a graph showing the relationship between a denitrification ratio and treatment time at a reaction temperature of 150° C. in the case of adding SOx as a catalyst poisoning material.
Figure 7:
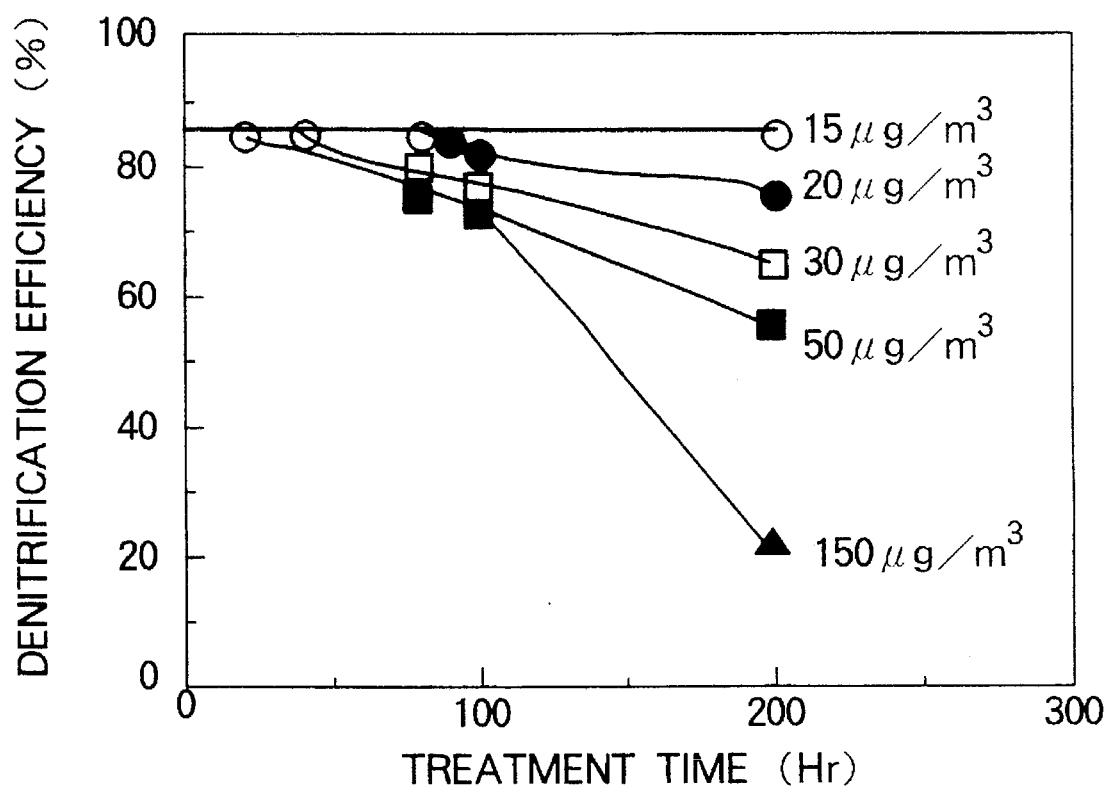
FIG. 7 is a graph showing the relationship between a denitrification ratio and treatment time at a reaction temperature of 120° C. in the case of adding Hg as a catalyst poisoning material.

Relationship between denitrification efficiency and contents of SOx and mercury in waste gas 20 g of a catalyst (Catalyst C described below) was charged in a substantially central part of a reactor tube of 24 mm in inner diameter and 300 mm in length in such a manner that the bulk density be about 0.83 g/cm$^3$ and used as a denitrification apparatus by dry process. Through this apparatus was passed a sample gas containing 180 ppm of NO, 5 vol % of $O_2$, 10 vol % of $H_2O$ and the balance of $N_2$, to which predetermined amounts of $SO_2$, Hg component and dioxin had been added, at an SV value of 5000 H$^{-1}$, flow rate of 2000 ml/min and reaction temperatures of 120° C. and 150° C. and a dry process denitrification treatment was thus carried out to obtain a denitrification efficiency and formation ratio of nitrous oxide ($N_2O$). There are shown the denitrification efficiency and formation ratio of nitrous oxide ($N_2O$) after the passage of 100 hours in Table 2, the relationships between the denitrification efficiency and treatment time at reaction temperatures of 120° C. and 150° C. when adding SOx (using $SO_2$) respectively in FIG. 5 and FIG. 6, and the relationship between the denitrification efficiency and treatment time at a reaction temperature of 120° C. when adding Hg in FIG. 7. It is apparent from Table 2 and FIG. 5 to FIG. 7 that high denitrification efficiencies, i.e. 85% at 120° C. and 99% at 150° C. treatments were obtained and no nitrous oxide ($N_2O$) was formed even after the passage of 100 hours when adjusting the SOx concentration to at most 10 ppm and the Hg concentration to at most 15 μg/m$^3$.

TABLE 2

| Catalyst No. Used | Concentration of Added Gas | Denitrification Efficiency (%) 120° C. | Denitrification Efficiency (%) 150° C. | Formation Ratio of Nitrous Oxide ($N_2O$) |
|---|---|---|---|---|
| Catalyst C | $SO_2$ (ppm) | | | |
| | 10 | 85 | >99 | 0 |
| | 50 | 80 | 95 | 0 |
| | 500 | 72 | 88 | 0 |
| | Hg (μg/m$^3$) | | | |
| | 1 | 85 | >99 | 0 |
| | 15 | 85 | >99 | 0 |
| | 150 | 74 | 87 | 0 |
| | Dioxin (μg/m$^3$) | | | |
| | 1 | 85 | >99 | 0 |
| | 15 | 85 | >99 | 0 |
| | 20 | 79 | 93 | 0 |

EXAMPLE 1

Desulfurization Treatment 180 g of a carbonaceous adsorbent (active coke) was charged in a substantially central part of a reactor tube of 100 mm in inner diameter and 500 mm in length in such a manner that the bulk density be about 0.6 g/cm$^3$ and used as a desulfurization apparatus by dry process. Through this apparatus was passed a gas to be treated having a composition (G1) of 200 ppm of NO, 1000 ppm of $SO_2$, 10 μg/m$^3$ of Hg, 10 μg/m$^3$ of dioxin, 5 vol % of $O_2$, 10 vol % of $H_2$ and the balance of $N_2$ at an SV value of 400 H$^{-1}$, flow rate of 2000 ml/min and reaction temperatures of 120° C., 150° C. and 180 ° C. and a dry process desulfurization treatment was thus carried out. The gas composition after the dry process desulfurization treatment was measured to obtain removal ratio of $SO_2$, Hg and dioxin. The results are shown in Table 3. The gas composition (G2) of after the dry process desulfurization treatment at 120° C. was 180 ppm of NO, 10 ppm of $SO_2$, 1 μg/m$^3$ of Hg, 1 μg/m$^3$ of dioxin, 5 vol % of $O_2$, 10 vol % of $H_2O$ and the balance of $N_2$.

Both the gas compositions were subjected to analysis of NO by chemiluminescence (chemical luminescent analysis), $SO_2$ by IR method (infrared spectroscopic analysis), Hg by JIS K 0222 and dioxin by GC-MASS method.

Comparative Example 1

1 liter of a solution of sodium hydroxide of 1 mol/l was maintained at temperatures of 50° C., 70° C. and 90° C., in which the treated gas composition (G1) used in Example 1 was bubbled at a flow rate of 120 liters/hr to effect a wet process desulfurization treatment, and the gas compositions were measured to obtain removal efficiencies of $SO_2$, Hg and dioxin. The results are also shown in Table 3. The gas composition (G3) of after the wet process desulfurization treatment at 90° C. was 180 ppm of NO, 100 ppm of $SO_2$, 9 μg/m$^3$ of Hg, 9 μg/m$^3$ of dioxin, 5 vol % of $O_2$, 20 vol % of $H_2O$ and the balance of It will clearly be understood from the results of Table 3 that it is difficult to remove Hg and dioxin by the wet process desulfurization system.

TABLE 3

| | Desulfurization System | Reaction Temp. (°C.) | Removal Efficiency (%) $SO_2$ | Hg | Dioxin |
|---|---|---|---|---|---|
| Example 1 | dry process | 120 | 99 | 90 | 90 |
| | | 150 | 99 | 87 | 85 |
| | | 180 | 99 | 84 | 82 |
| Comparative Example 1 | wet process | 50 | 90 | 5 | 6 |
| | | 70 | 90 | 8 | 9 |
| | | 90 | 90 | 9 | 10 |

Dentrification Treatment

Preparation of catalyst for denitrification treatment

A catalyst for the denitrification treatment was prepared by the following operation.

(Catalysts A~K) g

A solution of titanyl sulfate of about 30 weight % was hydrolysed by stirring at a temperature of 90° to 110° C. for 1 to 20 hours to obtain titanium oxide hydrate. 100 g of the resulting titanium oxide hydrate was washed with 1 liter of water at 80° C. five times, dried at 110° C. for 2 hours and then calcined at a temperature of 350° to 450° C. for 5 hours to obtain a support consisting of titanium oxide of anatase type. This support was then pulverized to control the grain size in 5 to 14 mesh., immersed in a saturated aqueous solution of ammonium metavanadate in a volume of ten times for 16 hours, then washed with water, dried at about 110° C. for 2 hours and calcined at a temperature of 350° to 450° C. for 1 hour to obtain Catalysts A, B, C, D, E, F, G, H, I, J and K for the denitrification treatment, comprising 10 weight % of vanadium oxide supported on titanium oxide of anatase type and having properties of a specific surface of 105 to 142 m$^2$/g, pores of 1.5 to 2.5 nm with a volume of 0.05 to 0.08 cc/g and pores of 7.5 to 8.5 nm with a volume of 0.05 to 0.08 cc/g.

(Catalysts L~N)

Catalysts L, M and N for the denitrification treatment, comprising 10 weight % of vanadium oxide supported on titanium oxide of anatase type and having properties of a specific surface of 56 to 163 m$^2$/g, pores of 1.5 to 2.5 nm with a volume of 0.03 to 0.05 cc/g and pores of 7.5 to 8.5 nm with a volume of 0.03 to 0.04 cc/g were obtained in an analogous manner to the preparation procedures of Catalysts A~K.

In addition, other Catalysts P, Q and R for the denitrification treatment were prepared as follows.

(Catalysts P~R)

Using commercially available titanium oxide of anatase type (P), silicon oxide (Q) and alumina (R), 30 parts by weight of each of them was mixed with 70 parts by weight of water, dried and treated in the similar manner to the preparation procedures of Catalysts A~K, thus obtaining Catalysts P~R for the denitrification treatment.

The preparation conditions and properties of the thus obtained Catalysts A~R for the denitrification treatment are tabulated below:

TABLE 4

| Denitri-fication Catalyst | Preparation of Support | | | Catalyst | Properties of Catalyst | | |
|---|---|---|---|---|---|---|---|
| | Hydrolysis | | Calcination | Calcination | | Pore Volume of | |
| | Temp. (°C.) | Time (hr) | Temp. (°C.) | Temp. (°C.) | Specific Surface Area (m²/g) | 1.5–2.5 nm (cc/g) | 7.5–8.5 nm (cc/g) |
| A | 100 | 5 | 350 | 350 | 200 | 0.05 | 0.07 |
| B | 100 | 5 | 450 | 400 | 128 | 0.05 | 0.06 |
| C | 90 | 5 | 400 | 400 | 138 | 0.05 | 0.06 |
| D | 90 | 20 | 400 | 400 | 112 | 0.05 | 0.05 |
| E | 100 | 2 | 400 | 400 | 142 | 0.06 | 0.07 |
| F | 100 | 10 | 400 | 400 | 108 | 0.05 | 0.05 |
| G | 110 | 1 | 400 | 400 | 135 | 0.05 | 0.06 |
| H | 110 | 5 | 400 | 400 | 105 | 0.05 | 0.05 |
| I | 100 | 5 | 380 | 380 | 185 | 0.08 | 0.08 |
| J | 100 | 5 | 380 | 400 | 162 | 0.08 | 0.07 |
| K | 100 | 5 | 400 | 380 | 171 | 0.07 | 0.08 |
| L | 100 | 15 | 400 | 400 | 120 | 0.05 | 0.03 |
| M | 80 | 15 | 350 | 350 | 163 | 0.03 | 0.03 |
| N | 100 | 5 | 550 | 400 | 56 | 0.03 | 0.04 |
| P | — | — | 420 | 400 | 112 | 0.01 | 0.06 |
| Q | — | — | 400 | 400 | 250 | 0.05 | 0.06 |
| R | — | — | 400 | 400 | 180 | 0.05 | 0.05 |

Example 2

20 g of a catalyst was charged in a substantially central part of a reactor tube of 24 mm in inner diameter and 300 mm in length in such a manner that the bulk density be about 0.83 g/cm³ and used as a denitrification apparatus by dry process. Through this apparatus was passed the gas (G2) after the dry process desulfurization treatment of Example 1 at an SV value of 5000 $H^{-1}$, flow rate of 2000 ml/min and reaction temperatures of 120° C. and 150° C., as to the above prepared Catalysts A, B, C, D, E, F, G, H, I, J and K respectively to effect a dry process denitrification treatment and the denitrification efficiency and formation ratio of nitrous oxide ($N_2O$) after the passage of 100 hours were obtained. High denitrification efficiencies were obtained, namely, 82 to 89% at a reaction temperature of 120° C. and at least 99% at a reaction temperature of 150° C. and no formation of nitrous oxide ($N_2O$) was found.

Comparative Example 2

A dry process denitrification treatment was carried out under the same conditions as those of Example 2 except using the gas (G3) after the wet process desulfurization treatment of Comparative Example 1, thus obtaining a denitrification efficiencies of 21 to 32% at a reaction temperature of 120° C. and 39 to 47% at a reaction temperature of 150° C. The results are shown in Table 5. It will be understood from these results and the results of Example 2 that when at least predetermined amounts of catalyst-poisonous materials such as sulfur oxides are contained, the catalyst is poisoned and the catalytic activity thereof is lowered with the passage of time.

Comparative Example 3

A dry process denitrification treatment was carried out under the same conditions as those of Example 2 except using Catalysts L, M, N and P as a denitrification catalyst, thus obtaining denitrification efficiencies of 41 to 45% at a reaction temperature of 120° C. and 56 to 62% at a reaction temperature of 150° C. The results are shown in Table 5.

It will be understood that even when using titanium oxide of anatase type, a high denitrification efficiency cannot be obtained unless the titanium oxide of anatase type satisfies the specified properties according to the present invention.

Comparative Example 4

A dry process denitrification treatment was carried out under the same conditions as those of Comparative Example 2 except using Catalysts Q and R as a denitrification catalyst, thus obtaining denitrification efficiencies of 8 to 10% at a reaction temperature of 120° C. and 17 to 21% at a reaction temperature of 150° C. The results are shown in Table 5.

When the amount of nitrous oxide ($N_2O$) in the gas after the dry process denitrification treatment was measured by TCD gas chromatography in Example 2 and Comparative Examples 2, 3 an 4, 1 to 3 ppm of nitrous oxide ($N_2O$) was detected in the case of using Catalysts L, M, N, P, Q and R.

TABLE 5

| Example | Catalyst Used | Treated Gas | Denitrification Efficiency (%) 120° C. | Denitrification Efficiency (%) 150° C. | Formation Ratio of Nitrous Oxide (N₂O) (%) |
|---|---|---|---|---|---|
| Example 2 | A | G 2 | 82 | >99 | 0 |
|  | B |  | 89 | >99 | 0 |
|  | C |  | 85 | >99 | 0 |
|  | D |  | 88 | >99 | 0 |
|  | E |  | 83 | >99 | 0 |
|  | F |  | 86 | >99 | 0 |
|  | G |  | 83 | >99 | 0 |
|  | H |  | 84 | >99 | 0 |
|  | I |  | 91 | >99 | 0 |
|  | J |  | 84 | >99 | 0 |
|  | K |  | 89 | >99 | 0 |
| Comparison Example 2 | A | G 3 | 25 | 41 | 0 |
|  | B |  | 32 | 47 | 0 |
|  | C |  | 29 | 44 | 0 |
|  | D |  | 30 | 45 | 0 |
|  | E |  | 21 | 39 | 0 |
|  | F |  | 27 | 46 | 0 |
|  | G |  | 31 | 43 | 0 |
|  | H |  | 28 | 41 | 0 |
|  | I |  | 35 | 42 | 0 |
|  | J |  | 29 | 46 | 0 |
|  | K |  | 33 | 44 | 0 |
| Comparison Example 3 | L | G 2 | 41 | 56 | 2 |
|  | M |  | 45 | 62 | 3 |
|  | N |  | 44 | 59 | 2 |
|  | P |  | 42 | 57 | 2 |
| Comparison Example 4 | Q | G 3 | 10 | 21 | 1 |
|  | R |  | 8 | 17 | 2 |

Advantages of the Present Invention

According to the process of the present invention, catalyst-poisoning materials such as mercury, halogen compounds, etc., in particular, mercury or halogen compounds except hydrogen halides, such as dioxin, etc., which cannot be removed by the desulfurization apparatus by wet process, can sufficiently be removed in the desulfurization treatment as a pre-treatment and therefore, the denitrification treatment as an after-treatment can stably be carried out for a long time as a whole of the process without deterioration of the catalyst. Furthermore, since reheating of the waste gas after the desulfurization treatment is not required, the energy efficiency is remarkably improved as a whole of the process.

What is claimed is:

1. A process for the desulfurization and denitrification by dry process comprising treating a waste gas containing SOx and NOx and catalyst-poisoning materials in an apparatus for mainly effecting desulfurization and then in an apparatus for mainly effecting denitrification, characterized by passing the waste gas through a desulfurization apparatus of a moving bed, in which a carbonaceous adsorbent is moved downward at a temperature of 100° to 200° C., adding ammonia to the waste gas at a temperature of 100° to 200° C., leaving the desulfurization apparatus, and then passing the waste gas through the low temperature denitrification apparatus, in which a catalyst of $TiO_2$-$V_2O_5$ comprising vanadium oxide supported on titanium oxide of anatase, having a specific surface area of 100 to 250 m²/g and micropores of 1.5 to 2.5 nm in pore diameter and 7.5 to 8.5 nm in pore diameter respectively in an amount of at least 0.05 cc/g, is filled, at a temperature of 100° to 200° C., thus effecting the denitrification.

2. The process as claimed in claim 1, wherein the treatment in the desulfurization apparatus is carried out until the contents of SOx, organo halogen compounds and mercury in the waste gas respectively become at most 10 ppm, at most 15 μg/m³ and at most 15 μg/m³.

3. The process as claimed in claim 1, wherein the waste gas contains at most 2000 ppm of SOx and at most 500 ppm of NOx with catalyst-poisoning materials containing as at most 300 μg/m³ of Hg, at most 60 ppm of HCl and at most 20 μg/m³ of organic halogen compounds.

4. The process as claimed in claim 1, wherein the ammonia is added to the treated gas leaving the desulfurization apparatus, in a proportion of 0.7 to 1.5 mol ratio to NOx contained in the treated gas.

5. The process as claimed in claim 1, wherein the vanadium oxide is supported on the support of titanium oxide by the use of a binder selected from the group consisting of colloidal silica, colloidal titania and colloidal alumina.

6. The process as claimed in claim 1, wherein the vanadium oxide is formed in situ from a compound readily convertible into vanadium oxide by an oxidizing treatment.

7. The process as claimed in claim 6, wherein the compound is ammonium metavanadate, $VOC_2H_4$, $VOCl_3$ or $VOSO_4$.

8. The process as claimed in claim 1, wherein the vanadium oxide is supported on the support of the titanium oxide in a proportion of 0.1 to 20 weight %, based on the support.

* * * * *